No. 887,313. PATENTED MAY 12, 1908.
F. G. CREED.
TELEGRAPHIC APPARATUS.
APPLICATION FILED MAR. 2, 1906.

Witnesses
W Henry Simms
E. Clough

Inventor:
F. G. Creed
Attorney

No. 887,313. PATENTED MAY 12, 1908.
F. G. CREED.
TELEGRAPHIC APPARATUS.
APPLICATION FILED MAR. 2, 1906.

No. 887,313. PATENTED MAY 12, 1908.
F. G. CREED.
TELEGRAPHIC APPARATUS.
APPLICATION FILED MAR. 2, 1906.

Witnesses.
W Henry Simms
E. Clough

Inventor.
F. G. Creed
per Lloyd Wise
Attorney

No. 887,313. PATENTED MAY 12, 1908.
F. G. CREED.
TELEGRAPHIC APPARATUS.
APPLICATION FILED MAR. 2, 1906.

No. 887,313. PATENTED MAY 12, 1908.
F. G. CREED.
TELEGRAPHIC APPARATUS.
APPLICATION FILED MAR. 2, 1906.

Witnesses
W. Henry Simms
E. Clough

Inventor
F. G. Creed
Attorney.

UNITED STATES PATENT OFFICE.

FREDERICK GEORGE CREED, OF GLASGOW, SCOTLAND, ASSIGNOR TO HIMSELF, WILLIAM ARTHUR COULSON, NICOL PATON BROWN, AND HUGH TAYLOR BROWN, OF GLASGOW, SCOTLAND.

TELEGRAPHIC APPARATUS.

No. 887,313.   Specification of Letters Patent.   Patented May 12, 1908.

Application filed March 2, 1906. Serial No. 303,837.

*To all whom it may concern:*

Be it known that I, FREDERICK GEORGE CREED, a subject of the King of Great Britain and Ireland, residing at Glasgow, Lanarkshire, Scotland, have invented Improvements in or Relating to Telegraphic Apparatus, of which the following is a specification.

This invention has reference to that kind of apparatus for perforating a tape in accordance with electric currents or impulses received over a line wire in the manner usual in automatic Wheatstone telegraphic receiving apparatus wherein the punch or punches used for perforating the tape are operated by a fluid pressure motor controlled through electro-magnetic mechanism that receives the electrical currents or impulses, and the correct position of the tape, previous to its being punched, is insured by correcting means that are caused to act upon a yielding feed wheel and adjust the same in a rotary direction relatively to the constantly running driving shaft used to feed the tape through the apparatus, the successive operations of correcting, punching and releasing the tape being performed so quickly that the time during which the rotation of the feed wheel is stopped, is practically negligible.

Now the present invention has for its object to further improve the construction and working of telegraphic apparatus of the kind referred to for producing practically perfect perforated Wheatstone tape from electric currents, impulses or signals (hereinafter called currents) received from a distant station. To this end in apparatus according thereto and in order to enable a high speed of working to be attained, the valve of the fluid pressure motor (hereinafter called the air motor) used for actuating the tape punching mechanism and tape correcting mechanism is actuated from the armature of an electro-magnetic device that is arranged to be placed in a local circuit and is caused to operate the armature alternately in opposite directions by currents from a separate electric generator (hereinafter called the local battery) that is under the control of a relay in the line wire over which the electric currents to be reproduced as perforations in a tape are sent, the local circuit of the said electro-magnetic device being further controlled by an automatic circuit making and breaking device that is under the control of the said armature, the arrangement being such that the currents passing through the electro-magnetic device are reduced to or cut off at unit length, no matter in what order or manner they arrive through the line relay.

In the accompanying illustrative drawings.

Figure 4:
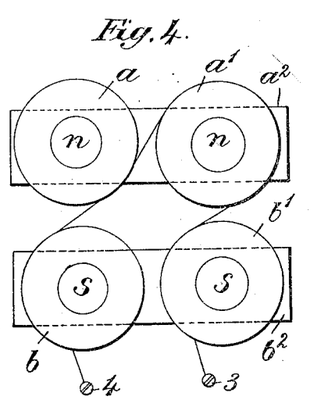
Figs. 4, 5 and 6 are diagrammatic views showing electrical connections.
Figure 5:
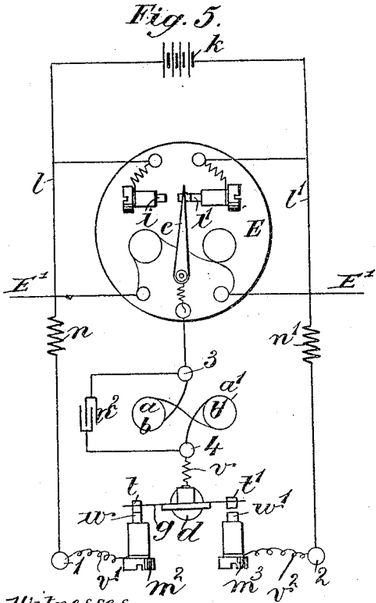

In the arrangement of apparatus illustrated, the electro-magnetic device comprises two pairs of electro-magnets $a$, $a^1$ and $b$, $b^1$, and a pivoted double armature comprising two iron bars $c$, $c^1$ that are connected together by yokes $c^2$ by which they are mounted to turn on a spindle $d$ which is supported vertically in a frame or holder $f$. The soft iron cores of the electro-magnets $a$, $a^1$ are connected together by an iron yoke $a^2$, and the cores of the electro-magnets $b$, $b^1$ are connected together by an iron yoke $b^2$. The windings of the magnets $a$ $a^1$, $b$ $b^1$ are connected in series, as shown diagrammatically in Fig. 4, so as to form practically a single winding which at one end is connected to a terminal 3 and thence as shown in Fig. 5 to the pivoted tongue $e$ of a sensitive relay E which is controlled by the line currents transmitted by the line wire $E^1$ from a distant station, and which may be of the ordinary post office standard type, the other end of the magnet winding being connected through a terminal 4 to the pivoted contact lever $g$ of a circuit making and breaking device. As shown, the armature $c$ $c^1$ is mounted to turn about an axis located in a plane between the poles of the magnets $a$ $b$ and $a^1$ $b^1$ so that first one of its arms, viz., $c$, can be attracted by the poles of magnets $a$ $b$ and afterwards its other arm, viz., $c^1$, can be attracted by the poles of magnets $a^1$ $b^1$ and thereby be caused to turn or move alternately in opposite directions. The cores of the magnets $a$ $a^1$ may, as shown, be arranged horizontally and above the cores of the magnets $b$ $b^1$ and be rendered permanently north by the north pole of a permanent magnet A placed behind them, and the cores of magnets $b$ $b^1$ be rendered permanently south by the south pole of the permanent magnet. The combined winding of the magnets passes round the magnet cores in such a way that a current passing through it in one direction will cause the north and south polarity of magnets $a$ and $b$ respectively to be increased and the north and south polarity of magnets $a^1$ $b^1$ to be reduced; and a current passing in the reverse direction will increase the north and south polarity of magnets $a^1$ $b^1$ and reduce the north and south polarity of magnets $a$ $b$ for the purpose of causing the armature $c$ $c^1$ to move alternately and sharply in opposite directions. The pivoted tongue $e$ of the relay is mounted to oscillate between two fixed contacts $i$, $i^1$.

The circuit making and breaking device can be variously constructed. In the example shown in Figs. 1, 2, 3, 5, and 6, it comprises a vulcanite rod $p$ mounted upon the upper end of the armature spindle $d$ which projects upwards through the cover plate $f^1$ of the magnet supporting frame $f$, the rod $p$ being fixed to the spindle by means of screws $p^1$. A screw $p^2$ passes through the rod $p$ well above the top end of the spindle $d$ and is screwed into a metal block $q$ between which and a flattened face $p^3$ on the vulcanite rod $p$ is tightly clamped a thin flat spring blade $g$ carrying at its extremities two electrical contacts $t$, $t^1$, the said spring blade constituting the pivoted contact lever $g$ hereinbefore referred to. A bent piece of brass $u$ is also clamped by the screw $p^2$ in the position shown, in order to permit of the attachment thereto and immediately over the center of motion of the spindle $d$ and contact lever $g$, of a wire $v$ which is connected to the terminal 4. The vulcanite rod $p$ serves to prevent any electrical connection between the armature spindle $d$ and contact lever $g$.

The two movable contacts $t$, $t^1$ on the spring blade $g$ are adapted to make electrical connection with two fixed contacts $w$, $w^1$ respectively formed on the ends of screws $x$, $x^1$ which are mounted in a vulcanite block $m$ for the purpose of insulation, the movements of the armature $c$ $c^1$ serving to cause contact to be made between the spring blade $g$ and the screws $x$, $x^1$ alternately. The ends of the spring blade $g$ are preferably sprung slightly towards the block $q$, thus causing them to bear firmly against the same, but when either of the contacts $t$, $t^1$ is moved against the corresponding contact $w$ or $w^1$, the movement of the armature spindle $d$ is easily able to bend the spring blade $g$ away from the corresponding end of the block $q$. When contact is broken between $t$ and $w$, or $t^1$ and $w^1$, the block $q$ instantly damps any vibration that might be set up in the spring blade $g$. The arrangement described permits the periods of electric connection to be prolonged for any desired time, and the slight rubbing movement produced between the surfaces of the contacts $t$ $w$ and $t^1$ $w^1$ upon breaking connection, and due to the play of the spring blade $g$, keeps the surfaces of the contacts clean. The block $m$ is fixed to the cover-plate $f^1$ of the magnet frame $f$ by a screw $m^1$ and two steady-pins (not shown). Screws $m^2$, $m^3$ serve for clamping connecting wires $v^1$ and $v^2$ respectively to two metal rods $z$, $z^1$ (indicated by dotted lines in Fig. 1), which slide in holes bored vertically through the block $m$. The contact screws $x$, $x^1$ are screwed through the metal rods $z$, $z^1$, respectively, the arrangement being such that when the screws $m^2$, $m^3$ are tightened upon the connecting wires $v^1$, $v^2$, they will pull the rods $z$, $z^1$ towards the top of the block $m$, and thus lock the screws $x$, $x^1$ in place. The screws $x$, $x^1$ are thus electrically connected with the wires $v^1$ $v^2$, which are in turn connected respectively with the binding screws 1 and 2 on the wooden base B.

Contacts $i$ and $w$ are connected together (see Fig. 5) and to one pole of a local battery $k$ by a conductor $l$ which may include a resistance device $n$, such as a coil, and the contacts $i^1$ and $w^1$ are similarly connected together and to the other pole of the local battery $k$ through another conductor $l^1$ that may also include a resistance device $n^1$, such as a coil. A condenser $n^2$ is preferably connected to the terminals 3 and 4 across the ends of the magnet winding to prevent sparking at the contacts.

The construction and arrangement of the apparatus is such that assuming the last signal received from the line wire $E^1$ by the relay E was a spacing current, then the relay tongue $e$ will have been caused to come to rest against the relay contact $i$ and the local circuit closed and opened, and the contact $t$ on the contact lever $g$ will be resting against contact $w$ of the circuit making and breaking device. If now a marking current arrives, the relay tongue $e$ will be moved into connection with the relay contact $i^1$ and will cause a current to flow from one pole of the local battery $k$ through the conductor $l$ and resistance device $n$, contacts $w$ and $t$ and contact lever $g$, the winding of magnets $b^1$, $a^1$, $a$ and $b$, and terminal 3 to the relay tongue $e$ and thence through contact $i^1$ and the conductor $l^1$ to the second pole of the battery. The electro-magnetic device ($a$, $a^1$, $b$, $b^1$) will then be energized so that the armature bar $c^1$ will be attracted by the magnets $a^1$ $b^1$, and, after a little more than one half of the movement of the armature has been made, it will move the contact lever $g$ so as to break the local circuit between contacts $w$ and $t$ and cause contact $t^1$ to bear against contact $w^1$, the local circuit remaining open until the relay tongue $e$ is caused by the action of a line current in the reverse direction to again bear against the relay contact $i$, whereupon a momentary current in the reverse direction will be sent through the magnet winding. When this takes place, a current will flow from the local battery $k$ in the reverse direction through the magnet winding by way of the first mentioned conductor $l$, relay contact $i$, relay tongue $e$, magnet winding, contact lever $g$, contacts $t^1$, $w^1$, and the secondly mentioned conductor $l^1$ and resistance coil $n^1$, whereby the magnets will move the armature $c$, $c^1$ in the reverse direction and cause it to move the contact $t^1$ from contact $w^1$ and cause contact $t$ to bear against contact $w$, the parts being then in the positions first mentioned.

By the arrangement described it will be understood that no matter how long the relay tongue $e$ may remain against either of the relay contacts $i$ $i^1$, no current will flow through the magnet windings except the temporary or initial current of unit length necessary to operate the armature. Furthermore, the arrangement not only saves current but what is of great importance, it enables powerful currents capable of producing strong and sharp response of the magnets to be used without allowing such current to flow for a sufficient time to overcharge the magnets; once the armature is turned in either direction, it is held at rest by the influence of the permanent magnet. The resistance coils $n$, $n^1$ serve to prevent short circuiting of the battery when the contact lever $g$ is in its midposition.

As the contacts $w$, $w^1$ are formed by the ends of the screws $x$, $x^1$, the duration of the flow of electric current can be regulated by endwise adjustment of the screws.

Figure 6:
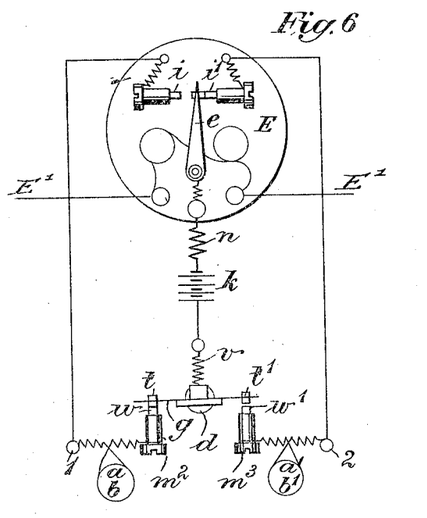

The arrangement shown in Fig. 6 is simpler than that shown in Fig. 5, as in this case only one resistance coil $n$ is necessary, the battery $k$ being placed in such a position between the tongue $e$ and the contact lever $g$ that it is impossible for it to be short-circuited in the process of working the apparatus. In this arrangement, when the tongue $e$ comes into connection with contact $i$, a current from the battery $k$ passes through contacts $w$ and $t$ and the coils of magnets $a$ and $b$ alone to contact $i$ and thence to the other pole of the battery. The current in passing through the winding of magnets $a$, $b$ may be caused either to decrease or increase the pull of the cores for the purpose of breaking the circuit between contacts $w$ and $t$, but in the figure shown it is arranged to work by diminution of pull. The circuit would in any case be broken between contacts $w$ and $t$ and be remade between contacts $w^1$ and $t^1$ but would be open between the tongue $e$ and contact $i^1$. On the tongue $e$ being moved against contact $i^1$, the current from the battery $k$ will pass through contacts $w^1$ and $t^1$ and the winding of magnets $a^1$ and $b^1$ alone, and find its way back to the other pole of the battery through contact $i^1$, the magnets $a$, $b$ remaining idle, and the circuit being of course again broken between contacts $t^1$ and $w^1$ by the diminution of the pull of the magnets $a^1$, $b^1$. While this arrangement has certain obvious advantages, it is thought that where high voltages are available, the arrangement shown in Fig. 5 is preferable, seeing that the reversal of current through the windings of the magnets has the effect of instantly sweeping out the residual charge, whereas in the arrangement shown in Fig. 6, the windings tend to become over-charged with working. In the arrangement shown in Fig. 6, a resistance $n$ in the battery circuit is not really necessary.

Figure 3:
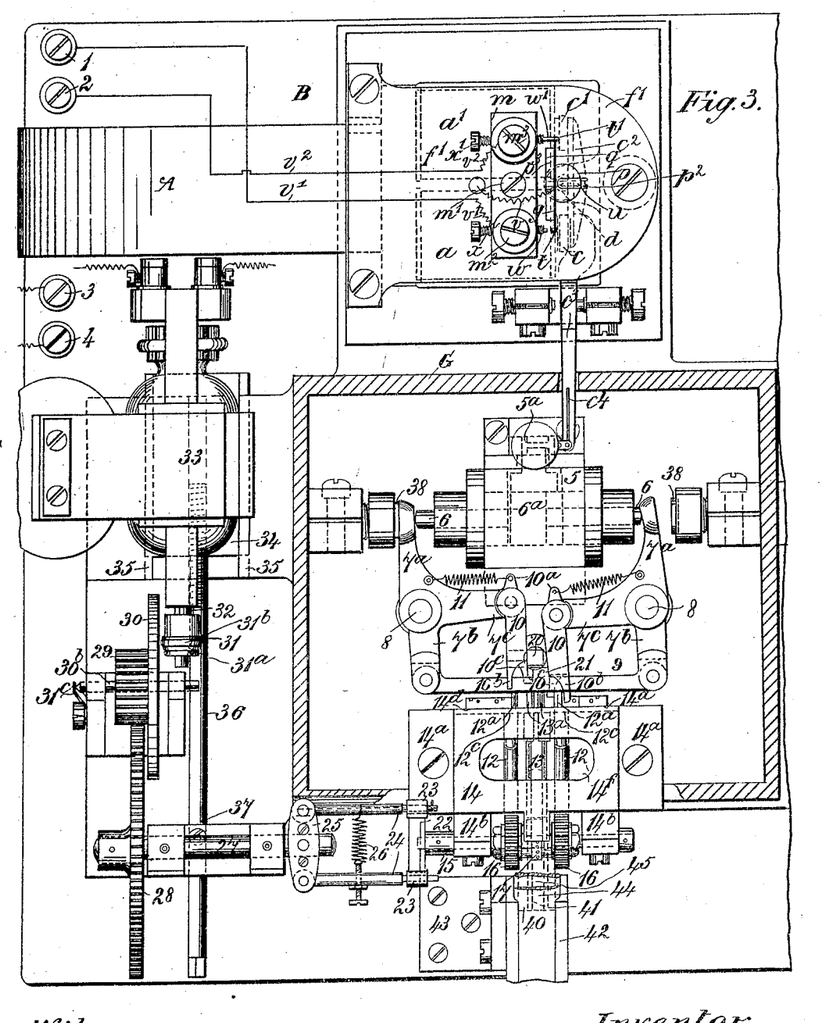
Figure 9:
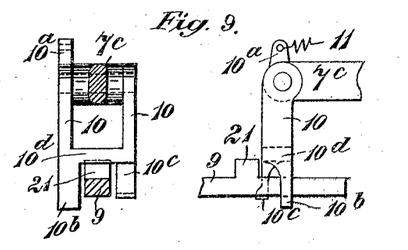
Figure 10:
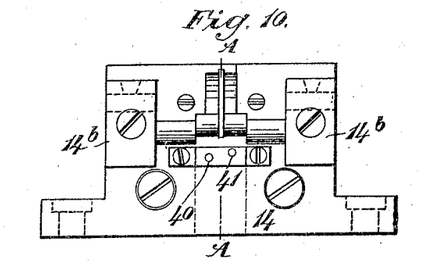
Figs. 10 and 11 show respectively in front and rear elevation and Fig. 12 in section on the line A A of Fig. 10, a punch block and attached parts.
Figure 11:
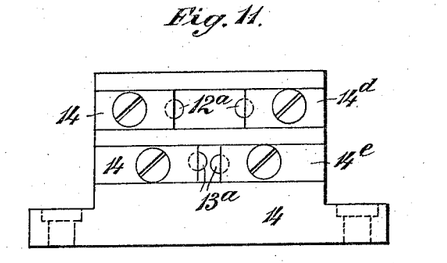
Figure 12:
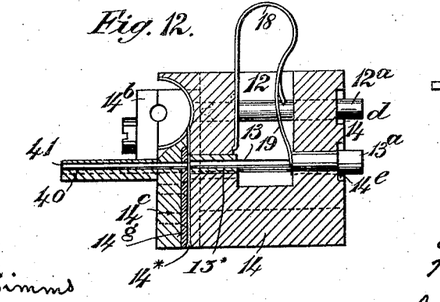

5 is the air motor the reciprocating valve $5^a$ of which, preferably in the form of a double piston valve, as shown, is operated from the armature $c$, $c$, preferably through a long thin flat arm $c^3$ of steel one end of which is split at $c^4$ and passed through a link $c^5$ which is connected to the end of the valve rod and is attached to the arm $c^3$ by a pin extending through the split in the arm and embraced by the two parts thereof, the split end $c^4$ of the arm affording a ready means of compensating for wear, as well as for absorbing shock, and the link $c^5$ providing considerable freedom from side strain. The valve $5^a$ controls the supply of compressed air to and its exhaust from each end of the motor cylinder, $5^b$ being the air inlet, and the exhaust being direct to the external atmosphere through the valve case. The piston rod 6 of the motor extends through both ends of the motor cylinder, and against each of its ends bears one arm $7^a$ of a three armed bell crank lever $7^a$, $7^b$, $7^c$, the two levers being pivoted upon heavy studs 8 and connected together by a rod 9 that is jointed to one of the other arms (viz. $7^b$) of each lever. To each of the third arms $7^c$ of each bell crank lever is pivoted a striker in the form of a lever 10—$10^a$ (Figs. 3 and 9) one arm, viz. $10^a$, of which is connected by a spring 11 to the arm $7^a$ of the corresponding bell crank lever, and the other arm, viz. 10, of which is adapted to abut against the rear end or head $12^a$ of a corresponding correcting device that may, as shown, be in the form of a rod 12, and also against the rear end or head $13^a$ of a corresponding punch 13. For this purpose the free end of the striker arm 10 may be forked as shown in Figs. 3 and 9, the prong $10^b$ being arranged to engage the head $12^a$ of the corresponding rod 12, and the prong $10^c$ being arranged to engage the head $13^a$ of the corresponding punch 13, the two prongs being connected by a cross bar $10^d$. The two correcting rods 12 and the two punches 13 are mounted to slide horizontally in a hardened steel block 14 that is fixed in place by screws 14$^a$ and is provided with bearings 14$^b$ for carrying the spindle 15 to which two correcting wheels 16 and the feed wheel 17 for moving the tape C (Fig. 1) forward are fixed.

Figure 1:
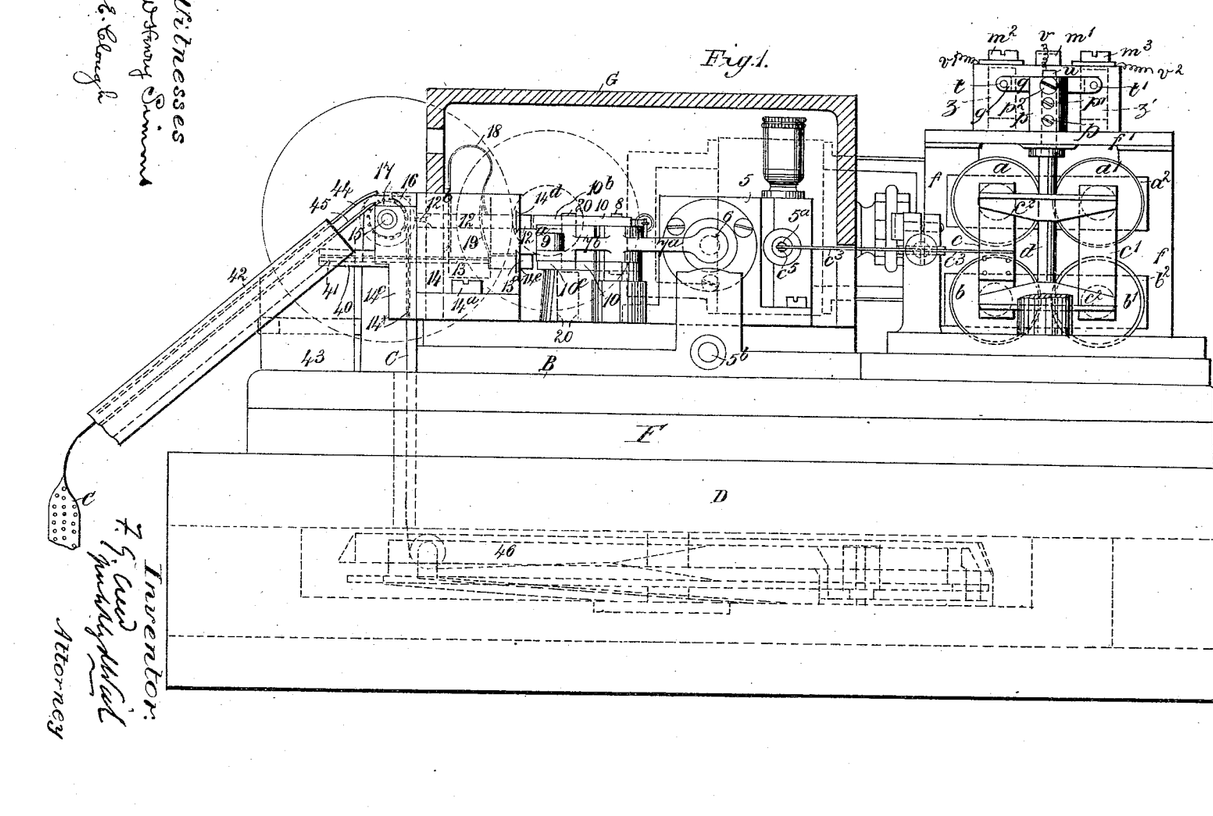
Figures 1 and 2 are elevations at right angles to one another, and Fig. 3 a plan, showing one arrangement of telegraphic apparatus embodying the present invention, a casing inclosing some of the parts being in section.
Figure 7:
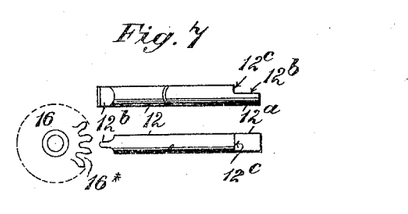
Figs. 7, 8 and 9 are detail views of mechanical parts.
Figure 8:
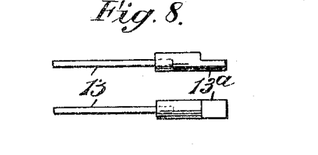

14$^c$ is the die plate fixed to the block 14 and into which the punches 13 extend when perforating the tape, a passage 14* being left between the block and die plate for the tape. The front end 12$^b$ of each correcting rod 12 is adapted, as by being flattened or made with a V-shaped point, as shown more clearly in Fig. 7, to enter the recesses 16* between the teeth of the corresponding correcting wheel 16 and correct the position of such wheel and the feed wheel 17 and tape C, if these parts be not in the proper position for punching. The rear end or head 12$^a$ of each correcting rod is flattened, as shown at 12$^b$, and formed with a shoulder 12$^c$ that abuts against a slide plate 14$^d$ attached to the block 14 and pushed up against the flattened face 12$^b$ so as to limit the rearward motion of the rod and to prevent the rod turning about its axis. The rear end or head 13$^a$ of each punch 13 is similarly formed and controlled by a slide plate 14$^e$, the two punches being arranged parallel to the correcting rods 12 but at a lower level, as shown in Fig. 1. The correcting rods and punches are normally held in their backward or retracted positions by bent spring blades 18 and 19 that are arranged within and extend upward through a hole 14$^f$ in the block 14. Between the two striker arms 10 is a fixed stop or stationary abutment 20 (Fig. 3) against which the cross bar 10$^d$ of each striker arm 10 in turn can be held by the corresponding spring 11 so as to hold the prongs 10$^b$ and 10$^c$ of such striker respectively in line with the corresponding correcting rod 12 and punch 13. Between the two striker arms 10 and carried by the rod 9, is a tappet 21 adapted to engage the cross piece 10$^d$ of each striker arm 10 in turn.

The feed wheel spindle 15 is driven by friction from suitable driving mechanism. For this purpose the spindle may be provided with a friction wheel 22 against diametrically opposite parts of the periphery of which bear two small friction blocks 23 carried by two arms 24 that are jointed at one end to a rotary carrier 25 and are connected together by an adjustable spring 26 by means of which the degree of friction between the friction wheel 22 and blocks 23 can be varied to suit requirement. The rotary carrier 25 in the example is fixed to the shaft 27 of a toothed wheel 28 which gears with the pinion 29 connected to a friction disk 30 against the face of which bears the periphery of a frictional driving wheel 31 consisting for example of a disk of india rubber or leather fixed between collars 31$^a$, 31$^b$ on the shaft 32 of a motor 33, for example an electric motor, that is adapted by screw adjustment to be moved endwise for moving the driving wheel 31 horizontally across the face of the friction disk 30 in order to adjust the speed of rotation of the feed wheel spindle 15 to suit requirement. The motor 33 may be moved endwise by fixing it to a block 34 that is arranged to slide in fixed guideways 35 and into which works the screw threaded end of a spindle 36 that is prevented from moving endwise, as by the point of a fixed screw 37 entering an annular groove 37$^a$ in its periphery, and which can be rotated, when required, by a crank handle to effect the desired endwise movement of the motor 33 and driving wheel 31. The disk 30 is kept in driving contact with the driving wheel 31 by a spring 31$^c$ bearing against the end of the spindle 30$^b$ carrying the said disk and the hub or pinion 29.

The arrangement is such that when the motor piston 6$^a$ is moved, say to the right, by the movement of the valve 5$^a$ to the left under the control of a line current and the armature $c$, $c^1$, the left hand striker arm 10, which will be then pressed by its spring 11 against one side of the stationary abutment 20, so that its prongs 10$^b$, 10$^c$ are in line with the left hand correcting rod 12 and punch 13, will be moved forward by the corresponding bell crank lever 7$^a$, 7$^b$, 7$^c$ through the rod 9 and the right hand bell crank lever 7$^a$, 7$^b$, 7$^c$, so as to cause the prong 10$^b$ to move the correcting rod 12 forward and cause the front end 12$^b$ of such rod to adjust the corresponding correcting wheel 16, feed wheel 17 and tape C, if this should be necessary, and then cause the prong 10$^c$ of the said arm to operate the corresponding punch 13 to perforate the tape C, the adjustment for punching being completed at about half the stroke of the striker arm, the part 12$^b$ of the correcting rod sliding further into the recess 16* of the corresponding correcting wheel 16 during the further operation of punching. The prongs 10$^b$, 10$^c$ of the striker 10—10$^a$ will then be moved out of contact with the correcting rod 12 and punch 13 by the tappet 21 moving to the left, so as to allow of the correcting rod 12 and punch 13 quickly making their return strokes under the action of their springs 18 and 19. During this action, the right hand striker arm 10, which was previously moved into the inoperative position by movement of the tappet 21 to the right, will be returned to its initial or starting position by its bell crank lever 7$^a$, 7$^b$, 7$^c$ and be pressed against the stationary abutment 20 by its spring 11 so that its prongs 10$^b$ and 10$^c$ will be again brought respectively into line with the right hand correcting rod 12 and punch 13. When the valve 5$^a$ is moved in the opposite direction, viz. to the right, by the action of a line current in the reverse direction and the armature $c$, $c^1$, and the motor piston 6$^a$ thereby caused to move to the left, the left hand bell crank lever 7ª, 7ᵇ, 7ᶜ will cause the prongs 10ᵇ, 10ᶜ of the right hand striker 10—10ª to act in succession upon the right hand correcting rod 12 and punch 13 and cause these to make their forward operative strokes for the purposes hereinbefore described, the said striker arm 10 being then moved into the inoperative position by the movement of the tappet 21 to the right so as to allow the rod 12 and punch 13 to snap back into their inoperative positions. During this movement, the left-hand striker 10—10ª will be again returned to its initial or starting position by the left hand bell crank lever 7ª, 7ᵇ, 7ᶜ and be again pressed against the stationary abutment 20 by its spring 11 so that its prongs 10ᵇ, 10ᶜ will again be in line respectively with the left hand correcting rod 12 and punch 13 in readiness for the next operation of the motor 5.

To enable the position of the feed wheel 17 and tape C to be corrected in good time for punching, as hereinbefore described, the operative end or tooth 12ᵇ of each synchronizing rod 12 is provided (see Fig. 7) with a parallel part adjacent to the rear end of the V-shaped point, and such part is arranged to enter a corresponding parallel part at the bottom of each V-shaped recess 16* between the teeth of the correcting wheel 16 just before the point of the corresponding punch 13 touches the tape C. In order to avoid cutting the parallel portions of the recesses in the correcting wheels 16 too deep and thus weakening these wheels, the tappet 21 on the connecting rod 9 may be arranged to knock each striker arm 10 in turn off the head 12ª of the corresponding correcting rod 12 about one thirty second of an inch sooner than it clears the head 13ª of the corresponding punch 13, thus enabling the punch to make a full stroke. This result can be attained by making the heads 13ª of the punches 13 a little broader than the heads 12ª of the correcting rods 12. The apparatus will however work satisfactorily when each punch 13 and the corresponding correcting rod 12 clear the corresponding striker 10—10ª at the same time, but the arrangement described is considered better as it also provides for wear of the parts. Each punch rod may conveniently, and as shown, be made of round wire flattened and shaped at one end 13ª to receive the blow of the corresponding striker and be formed at the other or front end with a central hole to receive the corresponding punch 13 or point which is or may be of hard steel. Each correcting rod 12 may also be similarly formed. The correcting rods 12 and punch rods 13 are so arranged that the points 12ᵇ of the correcting rods 12 will engage correcting wheels 16 arranged at opposite sides of the feed wheel 17, while the punches 13 will perforate the tape C at opposite sides of the central row of feed holes therein. Adjustable buffers 38 may be provided to adjust the travel of the bell crank levers 7ª, 7ᵇ, 7ᶜ and attached parts and to reduce noise.

Figure 13:
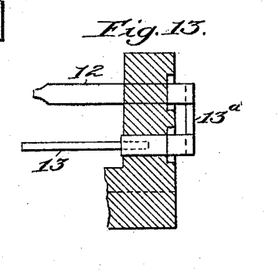
Fig. 13 is a detail view showing a modification.

By the arrangement described, each correcting device is rendered simpler and stronger in construction and more positive and direct in operation than is the case in the arrangements heretofore used. Each punch 13 may be connected to the corresponding correcting device 12 by a common head 13ª (Fig. 13) so that it would be impossible for one of such parts to make either its forward stroke or its return stroke without the other part. By making the parts separate however, as described and shown, better provision is made for wear thereof.

Various sections or parts of the apparatus hereinbefore described are so constructed and arranged as to be readily detachable and exchangeable. For instance, the die block 14 which carries the correcting rods 12 and punches 13 is so arranged that by the removal of the two screws 14ª, the complete die block with the said correcting rods and punches, and the feed wheel 17, correcting wheels 16, and driving spindle 15, can be removed without disturbing any of the other parts of the apparatus. The bell crank levers 7ª, 7ᵇ, 7ᶜ and striker mechanism 10—10ª; the air motor 5; and the electromagnetic valve actuating device can also be each removed without disturbing other parts.

Figure 2:
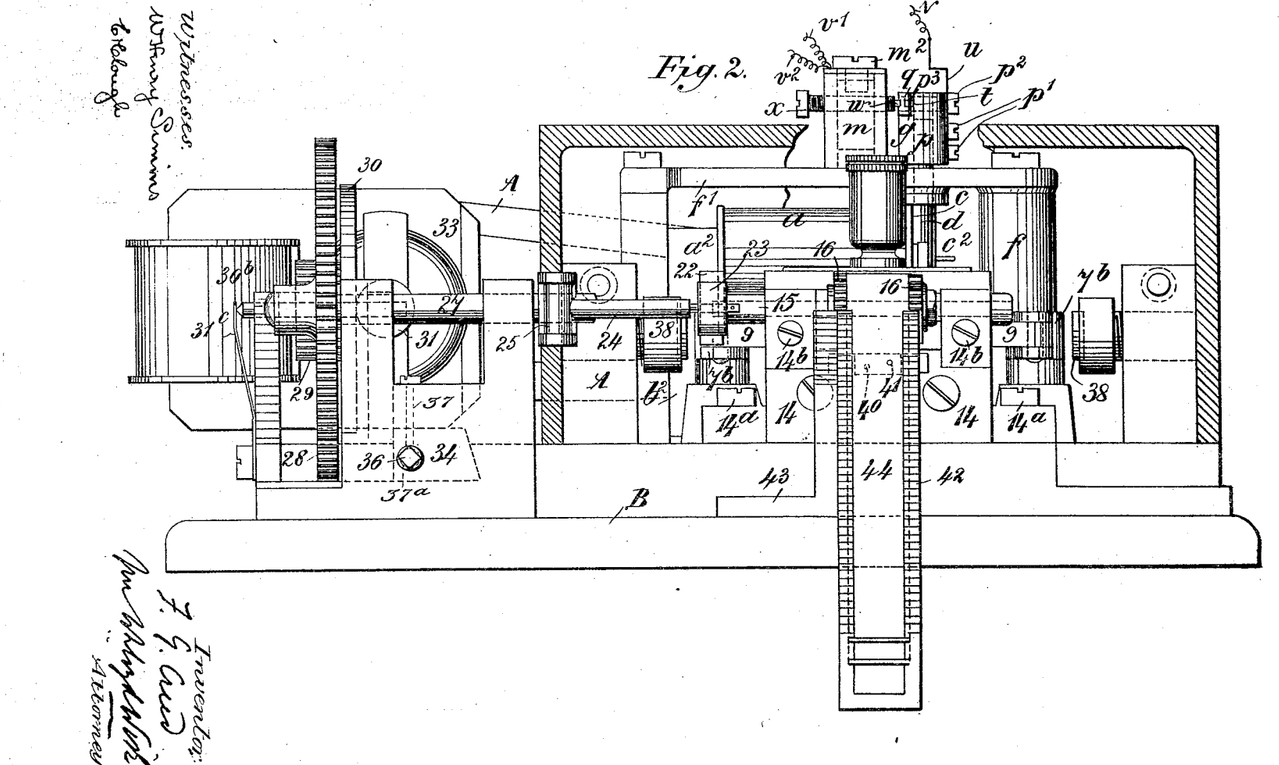

To the front face of the die plate 14ᶜ and opposite the punches 13 may be fixed a block 40 containing two holes 41 which form practically an enlarged extension of the punch holes in the die plate and are provided for the purpose of leading out the cuttings and discharging them into a chute 42. This chute 42 is mounted on a standard 43 and is provided with two plates 44 and 45, one of which viz., 44 serves as a cover, and the other 45 has its upper end shaped and arranged to strip the tape C off the feed wheel 17 and discharge it as shown. The tape reel 46 is mounted in a drawer underneath the apparatus, as indicated by the dotted lines in Fig. 1, and means are provided for leading the tape from the reel into the slot or passage 14* between the die block 14 and die plate 14ᶜ. The machine is mounted upon the inner wooden base B which is separated from the larger base D by a thick layer F of felt, and a cover not shown, is provided, also lined with felt, which serves the purpose of silencing the noise of working. A metal cover G shown in section in Figs. 1, 2 and 3, is provided to prevent the oil spray thrown up by the machine in working, from being carried to other parts of the apparatus.

As will be obvious the details of construction can be variously modified. Thus, the forward end of each punch 13 may be supported in a hard collet or tube 13* that can be conveniently removed when worn and replaced by a new one, and the cutting die may be formed by a thin removable hard steel plate 14ᵍ fixed to the die plate 14ᶜ. Also, it will be evident that various changes can be made in the construction of the apparatus hereinbefore described without departing from the spirit and scope of the invention so long as the relative arrangement of the main parts of the apparatus, or the mode of operation described, is preserved.

What I claim is:—

1. In telegraphic receiving apparatus, tape feeding mechanism, tape punching mechanism, means for actuating said punching mechanism, and means for controlling said actuating means in accordance with the electrical impulses received, said controlling means comprising an electric generator, an electro-magnetic device having a movable member adapted to cause movement of said actuating means, a relay independent of said actuating means and adapted to be operated in opposite directions by electric impulses in opposite directions and to close the circuit of said electro-magnetic device in one or other direction through said generator, and a circuit making and breaking device operated from a movable part of said apparatus and adapted to break the circuit of said electro-magnetic device after it has been closed by said relay.

2. In telegraphic receiving apparatus, tape feeding mechanism, tape punching mechanism, means for actuating said punching mechanism, and means for controlling said actuating means in accordance with the electrical impulses received, said controlling means comprising an electric generator having two circuits, a double acting electro-magnetic device having a movable member adapted to cause movement of said actuating means, a relay independent of said actuating means and subject to the electrical impulses received and adapted to close one or other of said circuits through said electro-magnetic device, and a double acting circuit making and breaking device operated from a movable part of said apparatus and adapted to break the circuit that has been closed by the movement of said relay in one direction and to close the other circuit at one point therein.

3. In telegraphic receiving apparatus, tape feeding mechanism, tape punching mechanism, means for actuating said punching mechanism in accordance with the electrical impulses received, said controlling means comprising a double acting electro-magnetic device having a movable member adapted to cause movement of said actuating means, a local circuit, a relay adapted to respond to the electrical impulses received thereby and to complete said local circuit and send current alternately in opposite directions through said electro-magnetic device, and a double acting circuit making and breaking device operated from a movable part of said electro-magnetic device and adapted to open each circuit in which the electro-magnetic device has been inserted by said relay and to close the other circuit at one point therein.

4. In telegraphic receiving apparatus, tape feeding mechanism, tape punching mechanism, and means for controlling said punching mechanism in accordance with the electrical impulses received, said controlling means comprising a double acting electro-magnetic device, a local circuit, a relay adapted to respond to the electrical impulses received thereby and to complete said local circuit and send current alternately in opposite directions through said electro-magnetic device, and a double acting circuit making and breaking device operated from said electro-magnetic device and adapted to open each circuit in which the electro-magnetic device has been inserted by said relay at a predetermined interval after the closing of said circuit, and to close the other circuit at one point therein.

5. In telegraphic receiving apparatus, tape feeding mechanism, tape punching mechanism, a motor for operating said punching mechanism, and means for automatically controlling said motor in accordance with the electrical impulses received, said controlling means comprising a double acting electro-magnetic device, a two-way local circuit including an electric generator, a relay subject to said electrical impulses and adapted to close one or other of two circuits through said electro-magnetic device and electric generator and cause said device to move alternately in opposite directions, and a circuit making and breaking device operated from said electro-magnetic device adapted to open the circuit of said electro-magnetic device each time it is closed by said relay.

6. In telegraphic receiving apparatus, tape feeding mechanism, tape punching mechanism, a motor for operating said punching mechanism, and means for automatically controlling said motor in accordance with the electrical impulses received, said controlling means comprising an electro-magnetic device having a pivoted armature, a two-way local circuit including an electric generator, a contact making and breaking device comprising a lever carrying two movable contacts, and two fixed contacts against which the movable contacts bear alternately, a relay having two stationary insulated contacts, and a pivoted tongue adapted to bear alternately, under the action of opposite electrical impulses, against said relay contacts, and electrical connections between the various parts of said controlling means whereby the electro-magnetic device will be energized and its armature caused to move in one direction when said tongue bears against one of the relay contacts and in the opposite direction when said tongue bears against the other relay contact, and said contact lever will be caused to bring about the opening of the circuit of said electro-magnetic device at one point therein each time it is closed and close the other circuit of said device at one of two points therein, substantially as described.

7. In telegraphic receiving apparatus, tape feeding mechanism, tape punching mechanism, a motor for operating said punching mechanism, and means for automatically controlling said motor in accordance with the electrical impulses received, said controlling means comprising a double acting electro-magnetic device having its windings connected in series and a pivoted armature, an electric generator, a circuit maker and breaker having a lever connected to said armature and carrying two movable contacts connected to one end of said windings and two insulated fixed contacts connected to the respective poles of said generator and against which said movable contacts will be caused to bear alternately when the lever carrying them is oscillated by said armature, and a relay designed to receive electrical impulses and having two insulated contacts connected to the respective poles of said generator and a pivoted tongue adapted to bear alternately against the relay contacts under the action of impulses of opposite kinds and bring about the operation of said armature alternately in opposite directions.

8. In telegraphic receiving apparatus, the combination with tape feeding mechanism, tape punching mechanism and a motor for operating said punching mechanism, of means for controlling said motor in accordance with the electrical impulses received, said controlling means comprising an electro-magnetic device, a local circuit including an electric generator and in which said electro-magnetic device can be included, a relay adapted to cause current to flow alternately in opposite directions through said circuit and electro-magnetic device, and a circuit making and breaking device operated from said electro-magnetic device and arranged to control the circuit thereof and comprising two fixed contacts and two movable contacts that are adapted to bear alternately against said fixed contacts and each adapted to remain in connection with the corresponding fixed contact for a predetermined time after the closing of the circuit of said electro-magnetic device before opening said circuit.

9. In telegraphic receiving apparatus, tape feeding apparatus, tape punching mechanism, a motor for operating said punching mechanism, and means for automatically controlling said motor in accordance with the electrical impulses received, said controlling means comprising a double-acting electro-magnetic device, two local circuits including current supplying means therefor, a relay subject to said electrical impulses and adapted to close one or other of said circuits to operate said device in one or other direction, and a circuit making and breaking device adapted to be operated by said electro-magnetic device so as when a predetermined time has elapsed from the closing of one of said circuits by said relay to open that circuit and close the other of said circuits at one point therein so that it can be completely closed by the next operation of said electro-magnetic device in the opposite direction.

10. Telegraphic receiving apparatus comprising a motor, controlling means which are subject to the action of electric impulses received by said apparatus and are adapted to control said motor, tape feeding apparatus including a tape feed wheel, and tape correcting and punching apparatus including a punch, a correcting wheel connected to said feed wheel, a correcting rod adapted to adjust said correcting wheel and so correct said tape, should correction thereof be necessary, before each perforation by said punch, a striker adapted to be operated by said motor and in each operative stroke to operate both said punch and said correcting rod, and means for returning said punch and said correcting rod, after they have been operated by said striker, into positions in which they will be clear of the tape and the correcting wheel respectively.

11. Telegraphic receiving apparatus comprising a motor, means adapted to control said motor in accordance with the electrical impulses received by said apparatus, tape feed apparatus including a feed wheel and means for rotating said wheel, tape correcting mechanism including two toothed wheels connected to said feed wheel and two correcting rods each adapted by endwise movement to adjust one of said toothed wheels and so correct the tape should correction thereof be necessary, two punches each adapted to perforate the tape, means for normally holding each of said punches in an inoperative position, and means for operating said correcting rods and punches, said means including two connected levers adapted to be moved alternately in opposite directions by said motor, strikers pivoted to said levers and each adapted to operate one of said punches and the corresponding correcting rod, a fixed abutment against which each striker is caused to bear and be held in the operative position, and a tappet device connected to said levers and adapted to move each striker in turn out of operative relation with the corresponding correcting rod and punch.

12. In telegraphic receiving apparatus the combination with controlling means subject to the action of electrical impulses received by said apparatus and a fluid pressure motor controlled by said controlling means, of tape feeding apparatus comprising a tape feed wheel, tape punching mechanism arranged to be operated from said motor, and tape correcting mechanism comprising two toothed wheels connected to said feed wheel and two correcting rods adapted to be operated by said motor and to make their operative strokes alternately and adjust the position of the tape, if this be necessary, before the tape is perforated.

13. In telegraphic receiving apparatus the combination with a motor and means adapted to control the motion thereof in accordance with the electrical impulses received by said apparatus, of tape feeding mechanism comprising a feed wheel and means for rotating the same, tape correcting mechanism comprising two toothed wheels connected to said feed wheel and two correcting rods each adapted by endwise movement to engage one of said toothed wheels and adjust the position of same and said feed wheel and tape if this be necessary, two punches each arranged to perforate the tape and normally held in an inoperative position, and means for operating said correcting rods and punches, said means comprising two connected levers arranged to be operated alternately in opposite directions by said motor, strikers pivoted to said levers and each having a forked end adapted to operate one of said punches and the corresponding correcting rod, a fixed abutment against which each striker is caused to bear and be held in the operative position, and a tappet device connected to said levers and adapted to move each striker in turn out of operative relation to the corresponding correcting rod and punch.

14. Telegraphic receiving apparatus comprising a motor, controlling means which are subject to the action of electric impulses received by said apparatus and are adapted to control said motor, tape feeding apparatus including a tape feed wheel, and tape correcting and punching apparatus including a punch, a correcting wheel connected to said feed wheel, a correcting rod adapted to adjust said correcting wheel and so correct said tape, should correction thereof be necessary, before each perforation by said punch, a striker adapted to be operated by said motor and in each operative stroke to operate both said punch and said correcting rod but to release said correcting rod before said punch, and means for returning said punch and correcting rod, after they have been operated by said striker, into positions in which they will be clear of the tape and the correcting wheel respectively.

15. In telegraphic receiving apparatus the combination with a motor and means adapted to control the motion thereof in accordance with the electrical impulses received by said apparatus, of tape feeding mechanism comprising a feed wheel and means for rotating the same, tape correcting mechanism comprising two toothed wheels connected to said feed wheels and two correcting rods each adapted by endwise movement to engage one of said toothed wheels and adjust the position of same and said feed wheel and tape, if this be necessary, two punches each arranged to perforate the tape and normally held in an inoperative position, and means for operating said correcting rods and punches, said means comprising two connected levers arranged to be operated alternately in opposite directions by said motor, strikers pivoted to said levers and each having a forked end adapted to operate one of said punches and the corresponding correcting rod, a fixed abutment against which each striker is caused to bear and be held in the operative position, and a tappet device connected to said levers and whereby each striker in turn is moved out of operative connection with the corresponding correcting rod and punch, the heads of the punches and correcting rods and the forked ends of the strikers being so relatively formed that when each striker is moved by said tappet device the corresponding correcting rod will be released before the corresponding punch.

16. In telegraphic receiving apparatus, a fluid pressure motor, an electro-magnetic device under the control of electrical impulses received by said apparatus and provided with an armature, a spring arm fixed at one end to said armature and having its other end split, and a part connecting the valve of said motor to said arm and extending through the split thereof and embraced by the portions of said arm on opposite sides of said split.

17. In telegraphic receiving apparatus, tape feeding mechanism, tape punching mechanism, and means for controlling said punching mechanism in accordance with the electrical impulses received, said controlling means comprising an electric generator, an electro-magnetic device, a relay adapted to be operated in opposite directions by electric impulses in opposite directions and to close the circuit of said electro-magnetic device in one or other direction through said generator, and a circuit making and breaking device adapted to break the circuit of said electro-magnetic device after it has been closed by said relay, said circuit making and breaking device comprising a holder adapted to be oscillated by a movable part of said apparatus, a block of conducting material fixed to said holder, a spring blade clamped at its central portion between said block and holder and extending beyond said block, movable electrical contacts carried by the extremities of said spring blade, and two fixed contacts arranged opposite said movable contacts.

Signed at Glasgow, in the county of Lanarkshire, Scotland, this twentieth day of February 1906.

FREDERICK GEORGE CREED.

Witnesses:
 THOMSON BRODIE,
 MARGARET W. HAMILTON.